(12) United States Patent
Miyata

(10) Patent No.: US 7,418,786 B2
(45) Date of Patent: Sep. 2, 2008

(54) MARKING DEVICE

(75) Inventor: Mitsuo Miyata, Machida (JP)

(73) Assignee: Kabushiki Kaisha Audio-Technica, Machida-shi (JP)

( * ) Notice: Subject to any disclaimer, the term of this patent is extended or adjusted under 35 U.S.C. 154(b) by 0 days.

(21) Appl. No.: 11/561,614

(22) Filed: Nov. 20, 2006

(65) Prior Publication Data

US 2007/0113745 A1    May 24, 2007

(30) Foreign Application Priority Data

Nov. 22, 2005    (JP) .............................. 2005-336892

(51) Int. Cl.
*G01C 15/00* (2006.01)
(52) U.S. Cl. .......................................... 33/291; 33/285
(58) Field of Classification Search .................. 33/285, 33/286, 290, 291, DIG. 21, 281, 282, 283
See application file for complete search history.

(56) References Cited

U.S. PATENT DOCUMENTS 6,606,798 B2 *    8/2003    El-Katcha et al. ............. 33/290

2004/0172836 A1 *    9/2004    Ng et al. ........................ 33/286

FOREIGN PATENT DOCUMENTS

JP    2004-301756    10/2004

* cited by examiner

*Primary Examiner*—G. Bradley Bennett
(74) *Attorney, Agent, or Firm*—Oblon, Spivak, McClelland, Maier & Neustadt, P.C.

(57) ABSTRACT

A marking device is disclosed which efficiently reduces damage affecting the gimbal mechanism even when such is used under sever conditions and is dropped from a high position. A marking device has a support mounted inside a housing, a light source unit holder swingably suspended by the support through a gimbal mechanism, and a light source unit mounted on the light source unit holder so as to diffuse a light flux only in a single direction to radiate a line of light. The support is coupled with said housing 1 through dampers with upper portion and lower portion formed of an impact absorber, and when outside impact is applied, the damper absorbs impact energy to prevent the impact force from being transmitting to the support.

10 Claims, 6 Drawing Sheets

MARKING DEVICE

BACKGROUND OF THE INVENTION

1. Field of the Invention

The present invention relates to a marking device configured for irradiating a vertical or horizontal line laser to a surface of the subject to be irradiated by diffusing light flux only in a single direction from a light source such as semiconductor laser, particularly related to the impact absorption structure thereof.

2. Related Background of the Invention

In a construction site, used is an optical marking device irradiating a vertical line light or a horizontal line light which is a criterion of a vertical degree and a horizontal degree of pillars and walls. Most of the light sources of the optical marking device are semiconductor lasers and are generally referred to as a laser marking device. The laser marking device suspends a mechanism referred to as a gimbal mechanism or a gyro mechanism (hereinafter referred to as "gimbal mechanism") in a perpendicular orientation so as to always maintain a vertical position and supports a light source unit including the semiconductor laser with the above mentioned light source unit holder. The light source unit includes a semiconductor laser as a light source, a collimating lens converting dispersing light radiated from the semiconductor laser into a parallel light flux, and a rod lens dispersing the parallel flux in a single direction. The parallel light flux enters into the rod lens from a direction perpendicular to a center axis thereof and is diffused in a fan shape only in a direction perpendicular to the above mentioned center axis by refraction by the rod lens. This diffusion light is irradiated to walls, ceilings, and floors of the building so as to draw straight lines by radiated light. Then a vertical line light can be irradiated by mounting the above mentioned light source unit on the above mentioned unit holder in such way that the center axis of the rod lens is horizontal. In addition a horizontal line light can be irradiated by mounting the above mentioned light source unit on the above mentioned unit holder in such way that the center axis of the rode lens is horizontal. Such is a fundamental principle of the laser marking device.

In the laser marking device, the light source unit holder supporting the light source unit is swingably supported by the gimbal mechanism. The laser marking device is required to accurately irradiate light of a vertical or horizontal direction line. For that reason, the gimbal mechanism desirably has a low friction resistance and the light source holder is desired to be maintained in a predetermined vertical direction position. Therefore, generally a bearing portion of the gimbal mechanism mainly comprises a ball bearing and an axis rotatably supported thereby. However, since potentially the lowest friction resistance is selected for the ball bearing employed in the gimbal mechanism of the laser marking device, a problem of impact resistance exists. Therefore, even in the case that the laser marking device is erroneously dropped down during use, the bearing portion is damaged adversely affected due to impact resistance to increase the friction resistance such that the light source unit holder cannot hold the predetermined position, which thus causes a problem of deteriorated accuracy of the irradiated line light.

In view of the foregoing, there has been proposed a laser marking device comprising a first support for swingably journaling a laser beam irradiating device with a first support shaft, a second support for swingably journaling the first support with a second support shaft perpendicular to the first support shaft, and a supporting member provided with a holding portion for holding the second support, wherein the second support is held on the above mentioned holding portion in such way that interference bodies are interposed respectively on both sides along longitudinal, lateral and vertical directions of the second support (ref. to, for example, Patent Reference 1, discussed below). The above mentioned "laser beam irradiation device" is the member corresponding to "light source unit holder" mentioned above. The first support shaft, the second support shaft and the second support comprise a gimbal mechanism. The above impact absorber reduces the impact otherwise applied to the above mentioned holding portion to transmit to the light source unit holder which is swingably journaled by the above mentioned gimbal mechanism, thereby reducing the damage to the gimbal mechanism.

The invention of the Patent Reference 1 is effective in protecting the gimbal mechanism when the laser marking device is dropped. However, the configuration of the above mentioned impact absorber of the Patent Reference 1 invention is required to entirely cover the exterior surface, top and bottom surfaces, and both side surfaces of the second support, which therefore increases the area and a volume of the impact absorber and thus increases the cost of the impact absorber. In addition, the volume of the laser marking device also increases due to the presence of the impact absorber. Moreover, there are many which are interfered with, such as the gimbal mechanism, the light source unit holder as well as the second support, for which impact absorbing effect should be improved. These factors also increase the volume of impact absorber.

Patent Reference 1 referred to above is Japanese Patent 2004-301756 A.

The present inventor proposes a marking device in which an impact absorber held by a support covers periphery of both ends of a shaft having a gimbal mechanism and above mentioned shaft is supported by the support through this impact absorber. That is an invention related to Japanese Patent Application 2005-64234.

According to the invention related to the above mentioned application, impact absorption effect is provided as expected. However, assuming that it is used under the severe conditions in dropping from a high location e.g. more than 1 m, it is found that even the invention related to the above mentioned application can not obtain a sufficient impact absorption effect.

SUMMARY OF THE INVENTION

An object of the present invention is to provide a marking device which effectively reduces damage to the gimbal mechanism even when it is used under sever conditions such as being dropped from a high location, and which is durable for subsequently continuous usage.

A marking device according to the present invention comprises a support mounted inside a housing, a light source unit holder swingably suspended by this support through a gimbal mechanism, and a light source unit mounted on this light source unit holder so as to diffuse a light flux only in a single direction to radiate a line of light, wherein the above mentioned support is coupled with the above mentioned housing through a damper with an upper portion and lower portion formed of an impact absorber, such that when an outside impact is applied the above mentioned damper absorbs impact energy so as to prevent the impact from being transmitted to the above mentioned support.

The damper has a hole provided therein in an axial direction and has a small diameter portion in a middle portion in the axial direction, the above mentioned hole being penetrated at one end by a mounting shaft coupled with the housing or the support and the damper is coupled with the support, wherein the above mentioned small diameter portion is fit in with a portion substantially integrated with the support or the housing so that an upper portion and an lower portion of the support are coupled with the housing through the dampers.

The support is configured such that the lower portion is supported by the housing through the damper and the upper portion is suspended by the housing through the damper. Therefore, the support is raised from the housing by interference of the damper. When the marking device falls down or is dropped, most of the impact force applied to the housing is absorbed by the dampers in the upper portion and the lower portion of the support so that the impact force is prevented from being transmitted to the support. For this reason, the impact force transmitted from the support to the gimbal mechanism is reduced and the impact force applied to the support portion of the shaft constituting the gimbal mechanism is also reduced, such that any damage affecting the gimbal mechanism is dramatically reduced. Even if relatively large impact force is applied thereto, the device can be continuously used without readjustment and repairs.

BRIEF DESCRIPTION OF THE DRAWINGS

FIG. 6(*c*) is a cross sectional view of the sleeve.

DESCRIPTION OF THE PREFERRED EMBODIMENT

An embodiment of the marking device related to the present invention will now be described with reference to drawings.

Figure 1:
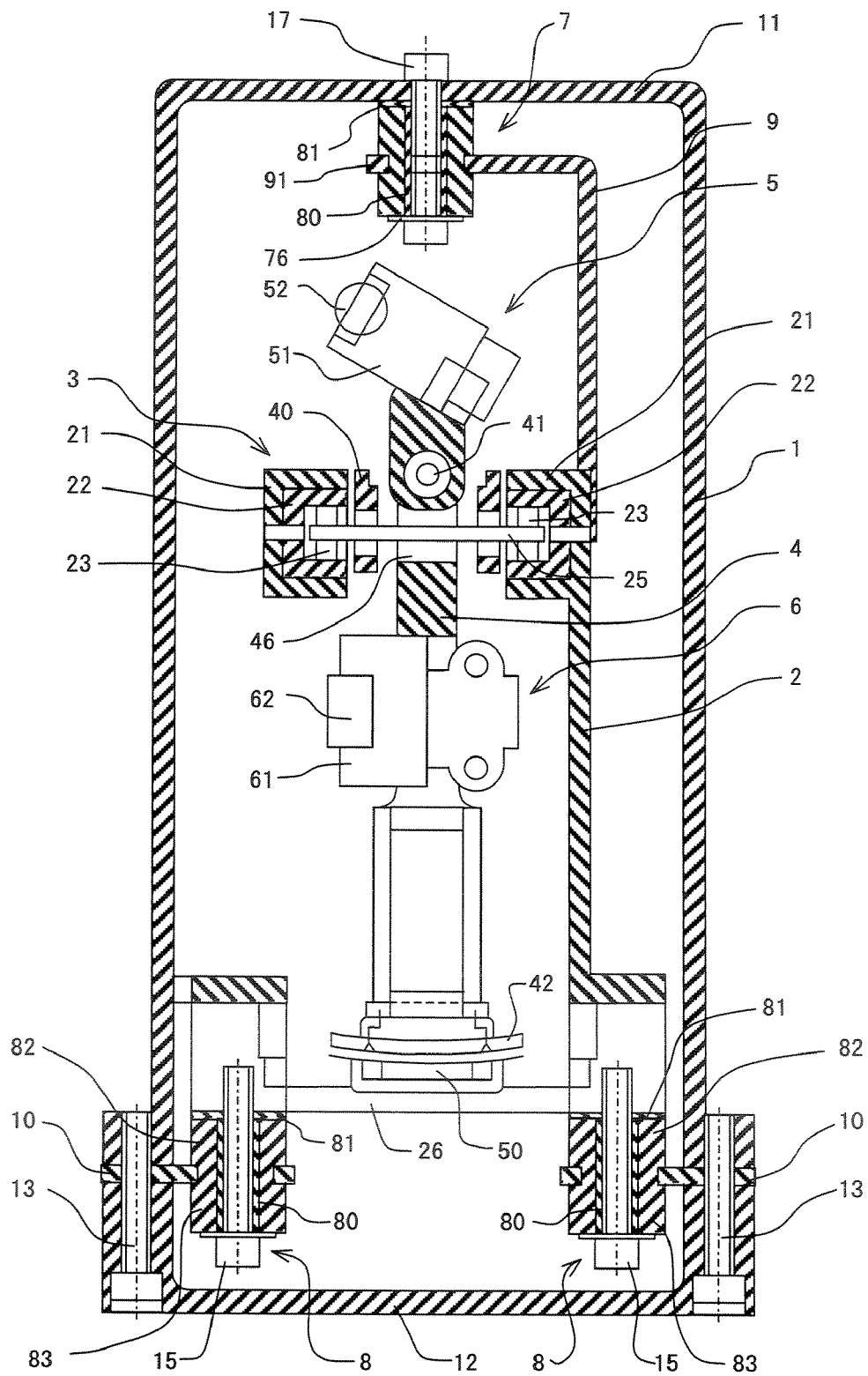
FIG. 1 is a side cross sectional view of a marking device according to one embodiment of the invention.
Figure 2:
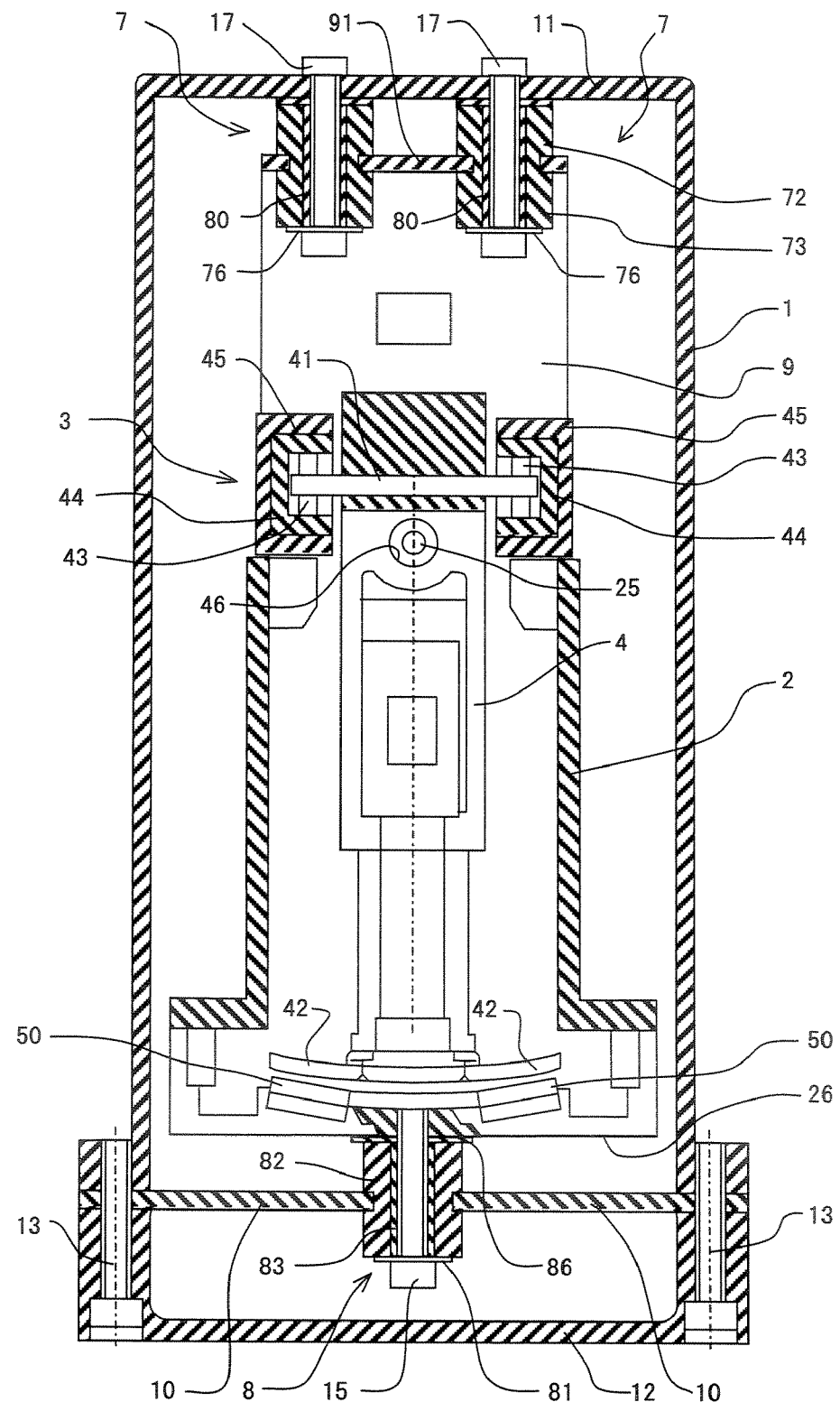
FIG. 2 is a front cross sectional view of the marking device.
Figure 3:
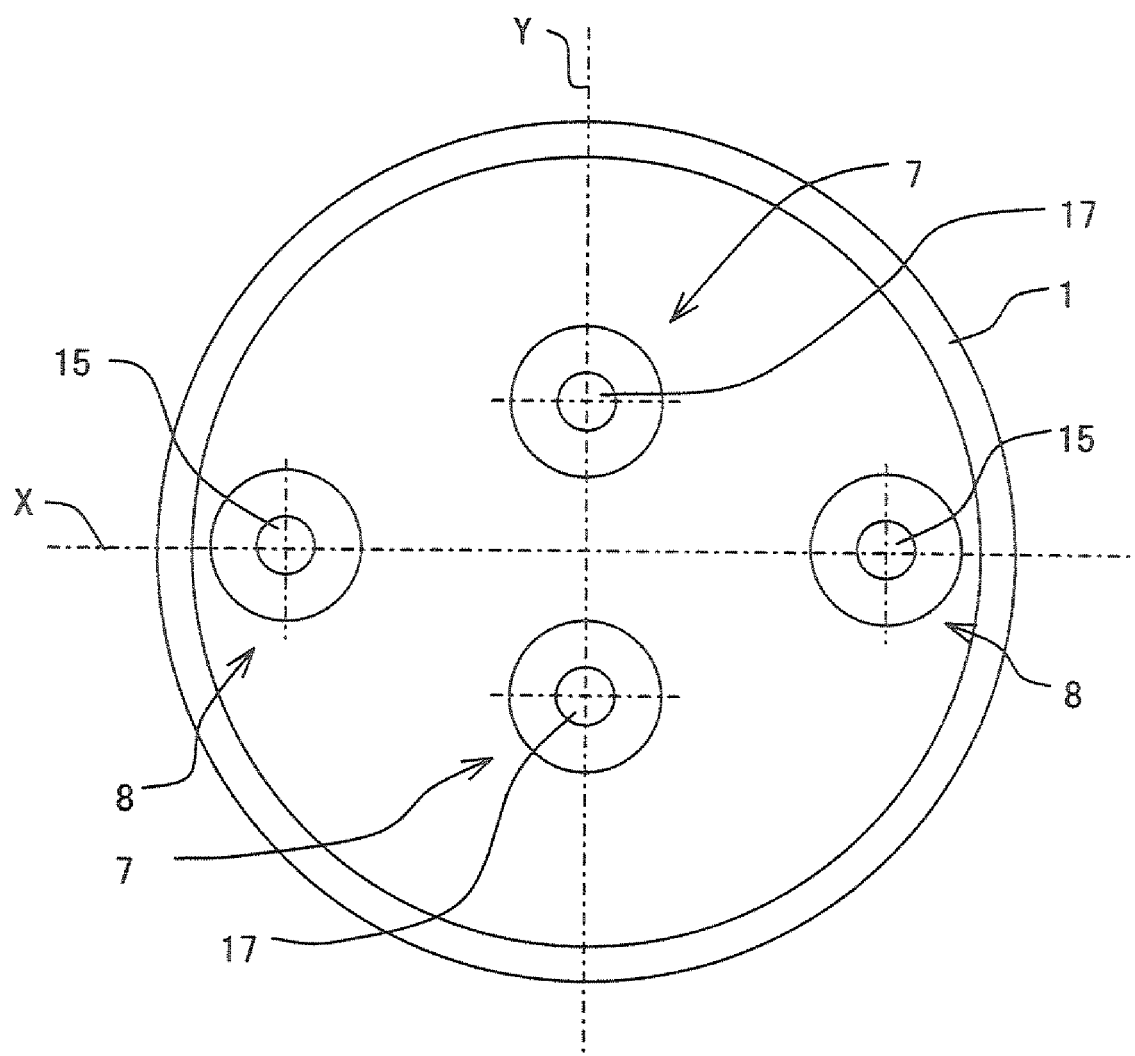
FIG. 3 is a schematic top plan view showing an arrangement relating to dampers in the upper and lower portions in the embodiment.

In FIGS. 1 to 3, a cylindrical housing 1 has a top plate 11 and a bottom plate 12, and a lower surface of the bottom plate 12 is mounted on a tripod, which is not shown, so as to be installed with the tripod in a vertically standing posture. In the housing 1 mounted is a support 2 for swingably supporting a light source unit holder 4. The present invention features a structure for mounting this support 2. The support 2 is coupled with the above mentioned housing 1 through dampers 7 and 8 formed of impact absorber at upper and lower portions. The upper dampers 7 are formed as a pair and each of the dampers 7 is mounted on the lower surface of the housing 1 with a screw 17. The lower dampers 8 are formed as a pair and are held by a diskform mounting member 10 horizontally fixed to inner periphery of the housing 1 in the vicinity of the bottom plate 12 of the housing 1. As shown in FIG. 3, assuming that a line connecting the centers of the lower dampers is in an X-axis direction line and a line connecting centers of the upper dampers is in a Y-axis direction line, the above mentioned X-axis direction line and Y-axis direction line cross at right angles with each other with respect to the center axis of the housing 1.

Figure 4:
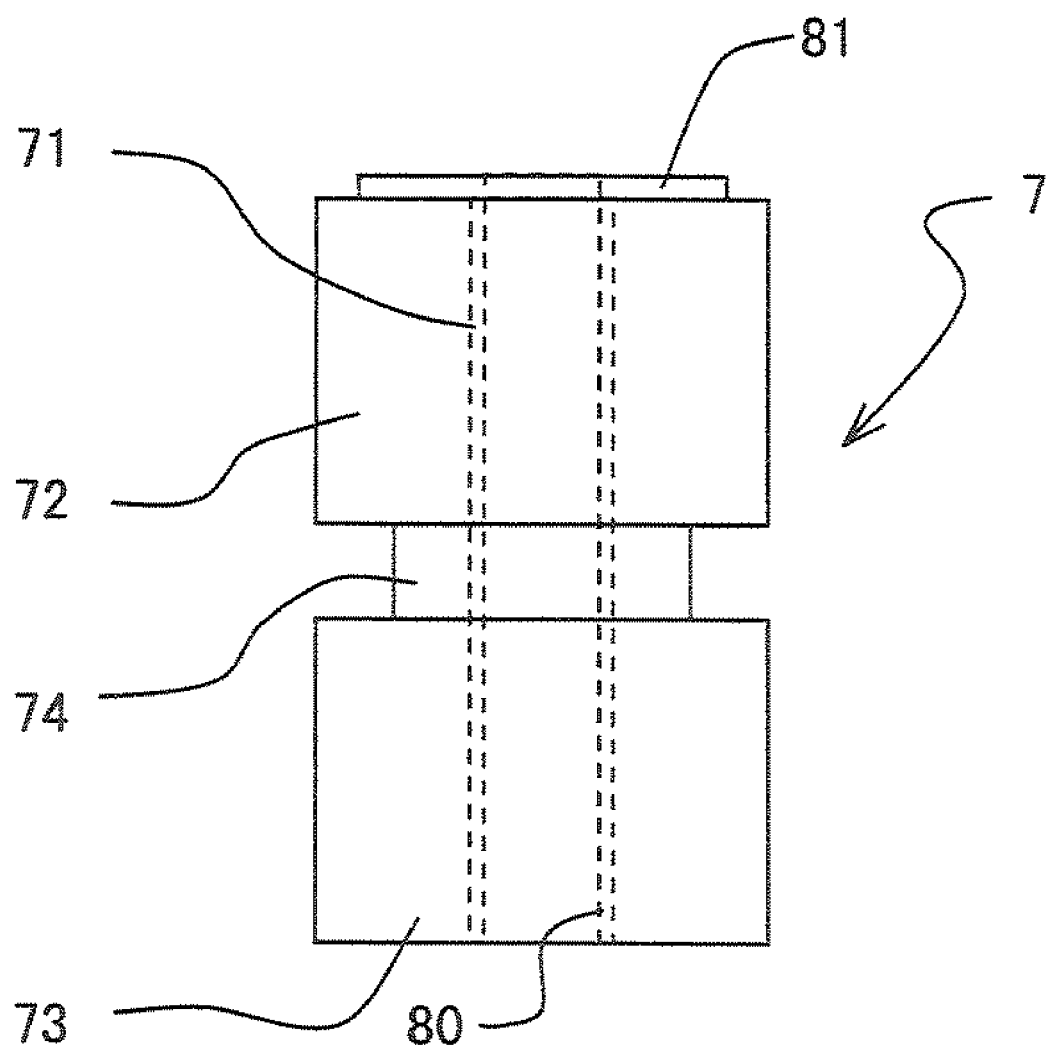
FIG. 4 is a front view of the damper.

Each of the above mentioned dampers 7 and 8 has the same structure and FIG. 4 shows a structure of the damper 7 representing these dampers. In FIG. 4, the damper 7 is entirely formed of an impact absorber and the damper 7 has an axial direction hole 71, a small diameter portion 74 around an outer periphery of axially center portion, and large diameter portions 72, 73 sandwiching the small diameter portion 74. The impact absorber forming the damper 7 has a characteristic such that an applied kinetic energy is absorbed by converting said energy into thermo energy and is required to have no repulsion force or a low repulsion force. There is "low repulsive rubber" as a material to meet the requirement and spongy low repulsive rubber is used in this embodiment. The above mentioned hole 71 is penetrated by a mounting shaft and one end of the mounting shaft is coupled with the above mentioned housing 1 or the above mentioned support 2, so that the housing 1 is coupled with the support 2 with the above mentioned damper 7 being interposed therebetween. Since the structures in which the housing 1 and the support 2 are coupled with the damper interposed are different between the upper portion and the lower portion, the structure of the coupling of the housing 1 and the support 2 will be individually described next with respect to the upper portion and the lower portion.

Figure 6:
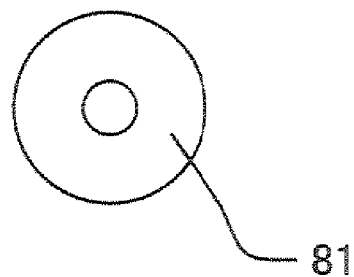
FIG. 6(*a*) is a front elevational view of a sleeve.
Figure 6:
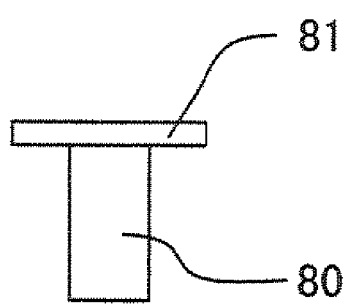
Figure 6:
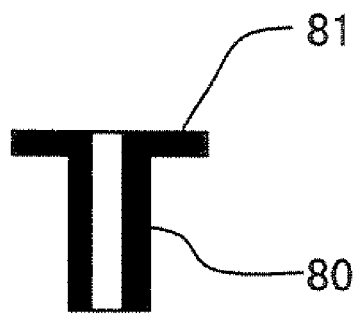

In FIGS. 1 and 2, an extension mounting member 9 is extended to the upper end of the support 2 by appropriate means such as a screw cramp. In the extension mounting member 9, an upper end portion and a lower end portion of a vertical plate are bent at a right angle in a form of a lateral U shape. In addition, a piece bent at the lower end of the mounting member 9 is coupled with the upper end of the support 2. A piece 91 bent at the upper end of the extension mounting member 9 is formed with two arc cuts, on each of which the small diameter portion 74 of the above-mentioned damper 7 is fit, thereby mounting the damper 7 on the extension mounting member 9 substantially integrated with the support 2. The hole 71 of each damper 7 is inserted with a sleeve 80 shown in FIG. 6. In FIG. 6, the sleeve 80 includes a cylindrical body portion fit in the center hole of the damper 7, and a flange portion 81 integrally continued with one end of the body portion. The center hole 71 of the above mentioned damper 7 is fit with the body portion of the sleeve 80, and the flange portion 81 of the sleeve 80 is adjacent the upper end face of the damper 7. A screw 17 penetrating the top plate 11 of the housing 1 passes through the center hole of the body portion of the sleeve 80 from the upper side, and each screw 17 projected from the lower end face of each damper 7 is fit with a washer 76 and further screwed with a nut. Thus each damper 7 is mounted on the top plate 11 of the housing 1 and the upper portion of the support 2 is coupled with the lower face side of the top plate 11 through each damper 7.

Figure 5:
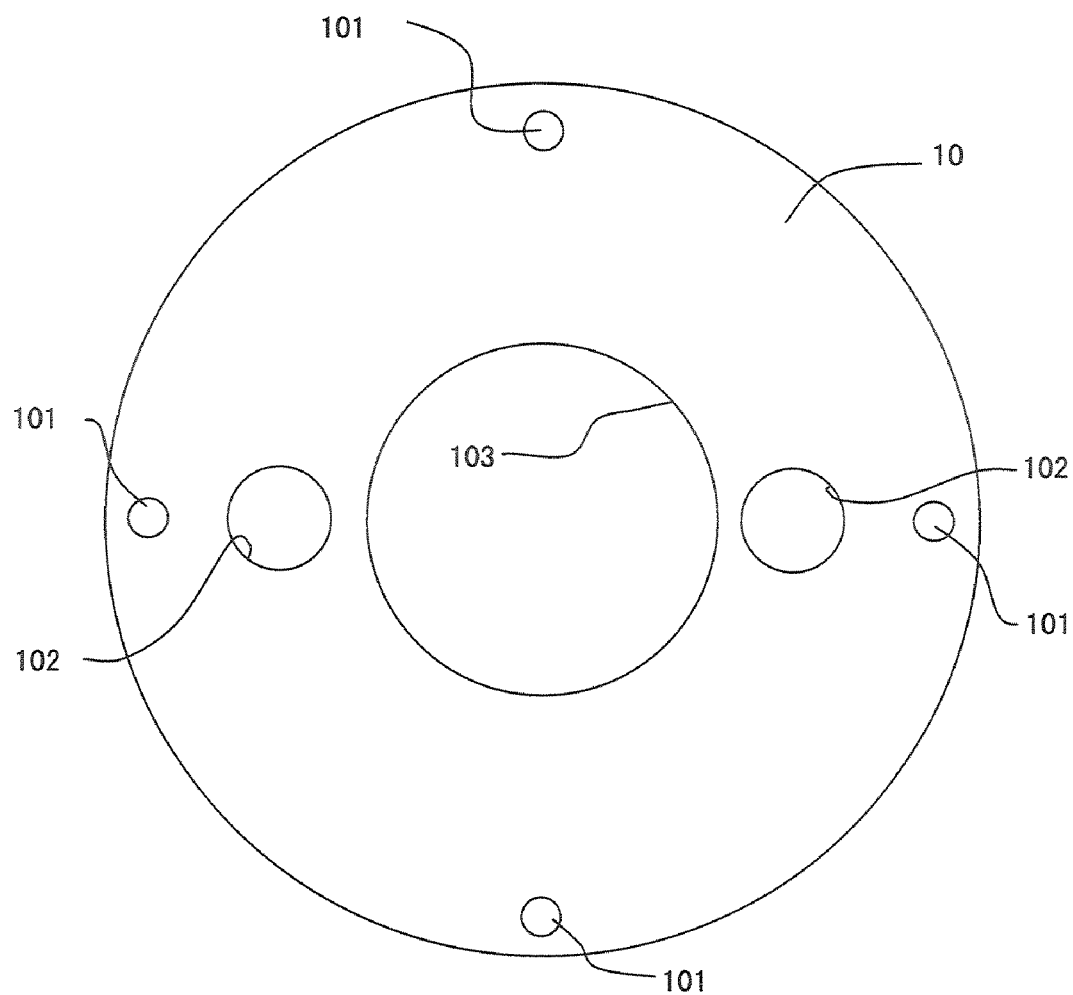
FIG. 5(*b*) is a cross sectional view of the mounting member.
Figure 5:
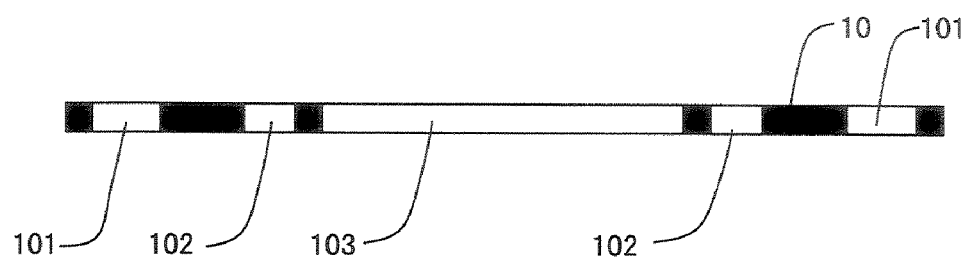

FIG. 5 shows the mounting member 10 fixed to the lower portion of the housing 1. As shown in FIG. 5, the mounting member 10 is formed out of a plane plate material into a ring shape, is provided with four mounting holes 101 circumferentially equally spaced at periphery of the mounting member 10, and has two round holes 102 for mounting the damper 8. The mounting member 10 also has a relatively big round hole 103 at the center of thereof. The mounting member 10 is sandwiched at the lower portion of the housing 1 and a screw 13 penetrating the above mentioned mounting hole 101 from the lower portion of the housing 1 is tightened and fixed to the body of the housing 1. The above mentioned two round hole 102 of the mounting member 10 is fit with the small diameter portion each of the dampers 8, thereby mounting the damper 8 on the mounting member 10 substantially integrated with the support 2. The center hole of each damper 8 is inserted with the body portion of the above mentioned sleeve 80 from the upper side, and the flange portion 81 of each sleeve 80 is adjacent to the upper end face of the damper 8. The screw 15 is screwed in the center hole of each sleeve 80 from the lower side, and the upper end portion of each screw 15 projected from the upper end face of each sleeve 80 is screwed into the bottom plate 26 of the support 2. A washer 86 is interposed between the top portion of each screw 15 and the bottom face of the damper 8 present at such location. Thus each damper 8 is coupled with the mounting member 10 substantially integrated with the housing 1, and the lower portion of the support 2 is coupled with the mounting member 10 substantially integrated with the housing 1 through each damper 8.

Thus, the upper portion of the support 2 is coupled with the top plate of the housing 1 through dampers 7 in such mode such that the top plate of the housing 1 suspend the support 2, and the lower portion of the support 2 is coupled with the lower portion of the housing 1 through the damper 8 and the mounting member 10 in such mode that the support 2 is supported upward from the lower portion of the housing 1. When an impact is applied in a vertical direction in a standing posture as shown in FIGS. 1 and 2, the support 2 tends to cause relative movement to the housing 1 in a vertical direction. At this time, the large diameter portions 72, 73 of both ends of the damper 8 in vertical direction are deformed and the large diameter portions 82, 83 of both ends of the damper 7 in vertical direction are deformed, so that each damper 7, 8 converts an impact force into thermal energy to reduce the impact force transmitted to the support 2. When the impact force is laterally applied due to the external factor such as fall of the housing 1 in FIGS. 1 and 2, the support 2 tends to cause relative movement to the housing 1 in a vertical direction. In this case, the small diameter portion 74 of each upper damper 7 is pushed by the bent piece 91 of the extension mounting member 9 integrated with the support 2, and the small diameter portion of each lower damper 8 is pushed by the mounting member 10 integrated with the housing 1. Since the small diameter portion of each damper 7, 8 is also formed of absorber material such as low repulsive rubber, the impact force to be transmitted to the support 2 is converted into thermal energy due to deformation of the small diameter portion of each damper 7 and 8 to reduce the impact force transmitted to the support 2.

The center hole of each damper 7, 8 is fitted with the sleeve 80 and each damper 7, 8 can deform along a circumference of the sleeve 80, thereby each damper 7, 8 is deformed smoothly and the damping function is efficiently performed.

The dampers 7, 8 each may be entirely and integrally formed of an impact absorber made of the same material. Since the impact force to be reduced is different in direction between the large diameter portion and the small diameter portion, different materials may be used so that the impact force is efficiently reduced based on the direction of the impact force to be reduced. In the case of different materials between the large diameter portion and the small diameter portion, different materials are arranged along the axial direction and adhered.

Next, the configuration of the light source unit holder 4 supported by the above mentioned support 2 and the gimbal mechanism 3 swingably suspending this light source unit holder 4 will be described. In FIGS. 1 and 2, a pair of bearing holders 21, 21 are integrally formed in the upper portion of the support 2. A pair of the bearing holders 21, 21 has a cylindrical shape with bottom and open ends are opposing with each other. And the damper 22, 22 having cylindrical shape with bottom are embedded inside the bearing holders 21, 21. Each damper 22, 22 may be formed of the material having absorption function, such as the impact absorber made of low repulsive rubber as well as in the above mentioned damper 7, 8. Bearing 23, 23 such as a ball bearing is fit in the bearing holder 21, 21 through each damper 22, 22, and a shaft 25 is rotatably supported by the bearing 23, 23.

An intermediate swinging frame 40 is swingably supported around the above mentioned shaft 25. The intermediate swinging frame 40 is integrally formed with a pair of bearing holders 45, 45. Each of the bearing holders 45, 45 has a cylindrical shape with bottom and open ends are opposing to each other. The dampers 44, 44 each have a cylindrical shape which is embedded inside each bearing holder 45, 45. The impact absorber made of low repulsive rubber may be used as a material of each damper 44, 44 similarly as for the above mentioned damper 7, 8. Bearings 43, 43 such as a ball bearing are fitted in the bearing holder 45, 45 through each damper 44, 44, and a shaft 41 is rotatably supported by the bearings 43, 43. The shaft 41 is supported on the upper side of the above mentioned shaft 25 in a direction perpendicular to the shaft 25. The shaft 41 suspends the light source unit holder 4 which is swingable around the shaft 41. The above mentioned bearing 23, 43, the shaft 25, 41, and the middle swinging frame 40 constitutes the gimbal mechanism 3, through which the support 2 swingably suspends the light source unit holder 4. The above mentioned shaft 25 penetrates the light source unit holder 4 and a relief hole 46 for the shaft 25 is formed in the light source unit holder 4 so that the shaft 25 does not obstruct the light source unit holder 4 swinging around the shaft 41.

A light source unit 5 is mounted on the upper end portion of the light source unit holder 4 and a light source unit 6 is mounted in the middle portion in vertical direction and under the above mentioned shaft 25. The light source unit 5 irradiates a vertical line of light and includes a unit case 51 and a rod lens 52 mounted on the upper end of the unit case 51. A semiconductor laser is mounted as a light source in the unit case 51 and a collimating lens for collimating diffusion light radiated from the semiconductor into parallel light flux is mounted. In the configuration, the above mentioned parallel light flux enters in a direction perpendicular to the center axis line with respect to the rod lens 52, and the rod lens 52 diffuses and outputs the parallel light flux only in a direction perpendicular to the center axis line. When the light source unit holder 4 is in the predetermined hanging position, the rod lens 52 of the light source unit 5 is in a horizontal direction and designed to irradiate the vertical light line. The light source unit 5 is configured to be mounted pointing obliquely upwards on the light source unit holder 4 to irradiate the line light from walls to ceilings of the building for example.

The other light source unit 6 irradiates a horizontal line of light and includes a unit case 61 and a rod lens 62 mounted to the end of this unit case 61. The unit case 61 is provided with semiconductor laser as a light source and a collimating lens for collimating diffused light radiated from the semiconductor laser into parallel light flux. In this configuration, the above mentioned parallel light flux enters in a direction parallel to the center axis line with respect to the rod lens 62 and the rod lens 62 diffuses and outputs the parallel light flux in a direction perpendicular to the center axis line. When the light source unit holder 4 is in the predetermined hanging position, the light source unit 6 is mounted pointing in a horizontal direction and the rod lens 62 of the light source unit 6 is oriented in vertical direction to irradiate horizontal line light.

The light source unit holder 4 is provided with a braking plate 42 in the lower end portion thereof. The braking plate 42 is to brake swinging of the light source unit holder 4 due to magnetic action, and is formed in such way that a swinging direction with the above mentioned shaft 25 as a center forms an arc following a swinging trait and formed to extend to both sides of the light source unit holder 4. A swinging direction of the above mentioned braking plate 42 with the above mentioned shaft as a center is formed in an arc following the swing trait. The material of the light source unit holder 4 is not particularly specified but at least a portion of the braking plate 42 is formed of conductive material. The upper face of the bottom plate 26 of the above mentioned support 2 is fixed with the appropriate number of magnets 50 appropriately spaced with respect to the above mentioned braking plate 42. Each magnet 50 is arranged through the appropriate yoke in such way that the magnet 50 is declined to cope with the arc face of the braking plate 42 to correspond the above mentioned braking plate 42 with the arc face. The braking plate 42 is located within a magnetic field formed by respective magnets 50. When the light source unit holder 4 is swung by the gimbal mechanism 3, the braking plate 42 crosses the line of magnetic force of the magnetic field to generate eddy current to the braking plate 42. With this eddy current, driving force (torque) is generated in a direction opposite to the swing direction of the light source unit holder 4. Therefore, this driving force functions as a force to stop the swing of the light source unit holder 4, and quickly stop the light source unit holder 4.

Thus the configuration of the embodiment shown in the drawings is as described above. Next, the action and effect of the above mentioned embodiment will be described. It is assumed that the marking device is applied with exterior impact for some factors such as dropping or falling down. As mentioned above, with regard to the vertical impact force, the large diameter portions in the both ends in vertical direction of dampers 7, 8 in the upper portion and the lower portion are deformed, whereby the dampers 7, 8 converts impact force into thermal energy to reduce impact force transmitted from the housing 1 to the support 2. With respect to horizontal impact force the small diameter portion of the dampers 7, 8 in the upper and the lower portion is pushed by a bent piece 91 of the extension mount member 9 and the deformation of each small diameter portion converts the impact force to reduce the impact force to be transmitted from the housing 1 to the support 2. Since the support 2 is mounted in such way that the upper portion and the lower portion of the support 2 are raised from the housing 1 due to interference of the dampers 7 and 8, the outside impact force is absorbed by respective dampers 7, 8, thereby the impact force transmitted from the housing to the support 2 can be dramatically reduced. The impact force applied to the gimbal mechanism 3 supporting the support 2 can be also reduced, damage to the gimbal mechanism caused by the outside impact force can be reduced, and accuracy distortion caused by the impact force applied to the marking device can be dramatically reduced. Therefore, it is durable even for rough handling, can be continuously used without readjustment or repair even if relatively big impact force is applied, and chances of readjustment or repair can be reduced.

An object of the present invention can be achieved by coupling the upper portion and the lower portion of the support 2 with the housing 1 through dampers 7 and 8 made of impact absorber. In addition to this, the shafts 25 and 41 constituting the gimbal mechanism 3 are supported through the dampers 22 and 44 as in the embodiment in the drawing so that damage applied to the shafts 25 and 41 of the gimbal mechanism 3 caused by outside impact force can be further efficiently reduced. Distortion of the accuracy due to the impact force can be efficiently reduced and chances of readjustment and maintenance can be reduced.

The damage applied to the shafts 25 and 41 of the gimbal mechanism 3 includes deformation of the bearing supporting the shafts 25 and 41 as well as bending and deformation of the shafts 25 and 41. When the shafts 25 and 41 of the gimbal mechanism 3 are subject to damage, the gimbal mechanism 3 does not operate smoothly and the light source unit holder 4 can not hold the predetermined hanging position, thereby causing uneven static positioning of the light source unit holder 4. As a result, line light irradiated from the light source units 5 and 6 is not in vertical direction or horizontal direction.

With this respect, with the present invention, since damage of the shaft of the gimbal mechanism due to the impact force can be reduced further efficiently, distortion of degree of the vertical line light and the horizontal line light can be prevented even if relatively big impact force is applied.

Although two dampers are provided respectively with regard to dampers 7 and 8 in the upper portion and the lower portion in the embodiment in the drawing, the number of dampers in the upper and lower portions is arbitrary. For example, in the upper portion and the lower portion, a plurality of dampers may be arranged in one portion and a single damper may be arranged in the other portion. Further, three dampers may be arranged at least one portion and the dampers may be supported by support at three points.

As shown in the embodiment of the drawing, the upper portion and the lower portion each has a pair of dampers, and dampers are arranged in such way that a line connecting the centers of two dampers in the upper portion and a line connecting centers of two dampers in the lower portion are perpendicular with each other. Then the support is prevented from declining in one side and the support can be stably supported.

What is claimed is:

1. A marking device comprising:
a support mounted inside a housing;
a light source unit holder swingably suspended by said support through a gimbal mechanism; and
a light source unit mounted on this light source unit holder so as to diffuse a light flux only in a single direction to radiate a line of light;
said support being coupled with said housing through dampers in an upper portion and lower portion of the support and wherein the dampers are formed of an impact absorber, such that when an outside impact is applied to the housing, said dampers absorb impact energy so as to prevent the impact force from being transmitted to said support,
said dampers having a hole in an axial direction thereof and a small diameter portion in a middle portion thereof in the axial direction; and
a mounting shaft positioned in the hole and coupled with the housing or the support at one end of the mounting shaft, the damper being coupled with said support, and wherein said small diameter portion is fit in with a portion substantially integrated with said support or housing so that the upper portion and the lower portion of the support are coupled with the housing through the dampers.

2. The marking device according to claim 1, wherein the damper absorbs a vertical impact force of the marking device at both ends in an axial direction thereof and a horizontal impact force of the marking device at the small diameter portion in the middle portion in an axial direction thereof.

3. The marking device according to claim 1, wherein dampers in the upper portion and the lower portion of the support each comprise a pair of dampers, and a line connecting centers of the pair of dampers in the upper portion is mutually perpendicular to a line connecting centers of the pair of dampers in the lower portion.

4. The marking device according to claim 1, wherein one of the upper portion and the lower portion of the support have a plurality of said dampers positioned therein and the other portion is arranged with a single damper.

5. The marking device according to claim 1, wherein at least one of the upper portion and the lower portion of the support is arranged with three dampers and supported at three points.

6. The marking device according to claim 1, wherein materials of the dampers are different between both end sides in an axial direction of the dampers and the small diameter portion in the middle portion in axial direction of the dampers.

7. The marking device according to claim 1, wherein the gimbal mechanism comprises a plurality of shafts and at least shafts thereof are supported by the support and are supported by said support through impact absorbing dampers covering the both end portions of the support.

8. The marking device according to claim 1, wherein a mounting member is fixed inside a periphery of the bottom portion of the housing, the mounting member is fitted in with the small diameter portion of the damper in the lower portion of the support, and the lower portion of the support is coupled with the housing through the damper.

9. The marking device according to claim 1, wherein the upper portion of the support is extended with an extension mounting member, the mounting member is fit in with the small diameter portion of the damper in the upper portion of the support and wherein the upper portion of the support is coupled with the housing through the damper.

10. The marking device according to claim 1, which comprises a sleeve which is fit in the hole of the damper in axial direction and a mounting shaft which is positioned with the hole of the sleeve.

* * * * *